United States Patent [19]

Kido et al.

[11] Patent Number: 4,853,673

[45] Date of Patent: * Aug. 1, 1989

[54] SHIFT INDICATOR SYSTEM FOR VEHICLE

[75] Inventors: Yoshinobu Kido; Toshihiro Yamada, both of Hiroshima, Japan

[73] Assignee: Mazda Motor Corporation, Tokyo, Japan

[*] Notice: The portion of the term of this patent subsequent to Jul. 28, 2004 has been disclaimed.

[21] Appl. No.: 890,289

[22] Filed: Jul. 29, 1986

[30] Foreign Application Priority Data

Jul. 30, 1985 [JP] Japan .................... 60-169308

[51] Int. Cl.⁴ ............................................. B60Q 1/00
[52] U.S. Cl. ...................................... 340/439; 74/856; 340/441; 364/424.1; 364/442
[58] Field of Search ............... 340/52 R, 52 D, 62, 340/71, 74, 79, 80, 52 F; 200/61.88; 307/10 R; 364/442, 424.1; 74/856, 861, DIG. 6, DIG. 7; 434/71; 73/117.3; 123/481, 351

[56] References Cited

U.S. PATENT DOCUMENTS

| | | | |
|---|---|---|---|
| 4,174,766 | 11/1979 | Kalogerson | 340/52 D |
| 4,282,780 | 8/1981 | Totani et al. | 74/861 |
| 4,354,173 | 10/1982 | Kuhn et al. | 340/52 D |
| 4,438,423 | 3/1984 | Stier | 340/62 |
| 4,492,112 | 1/1985 | Igarashi et al. | 364/442 |
| 4,539,868 | 9/1985 | Habu | 364/442 |
| 4,550,596 | 11/1985 | Ueda | 364/424.1 |
| 4,559,599 | 12/1985 | Habu et al. | 340/52 D |
| 4,622,637 | 11/1986 | Tomita et al. | 340/52 D |
| 4,677,556 | 6/1987 | Habu | 364/424.1 |
| 4,683,455 | 7/1987 | Kido et al. | 340/52 R |
| 4,689,745 | 8/1987 | Itoh et al. | 364/424.1 |
| 4,703,304 | 10/1987 | Muguruma et al. | 74/861 |

FOREIGN PATENT DOCUMENTS 59-26332  2/1984  Japan .
59-29519  2/1984  Japan .
59-29520  2/1984  Japan .

Primary Examiner—Joseph A. Orsino
Assistant Examiner—Brent A. Swarthout
Attorney, Agent, or Firm—Gerald J. Ferguson, Jr.

[57] ABSTRACT

A shift indicator system for a vehicle comprises an engine speed sensor, an engine speed comparator for comparing the engine speed detected by the engine speed sensor with a preset value, an indicator which provides an indication for directing upshifting when the engine speed is not lower than the preset value, a delay circuit which inhibits the indicator from providing the indication for directing upshifting until the engine speed continues to be not lower than the preset value for a predetermined time interval, an engine speed increasing rate detector for detecting the rate of increase of the engine speed, an engine load increasing rate detector for detecting the rate of increase of the engine load, and a delay time setting circuit which receives the outputs of the engine speed increasing rate detector and the engine load increasing rate detector, and makes the predetermined time interval shorter as the engine speed increasing rate increases and longer as the engine load increasing rate increases.

13 Claims, 4 Drawing Sheets

F I G. 1
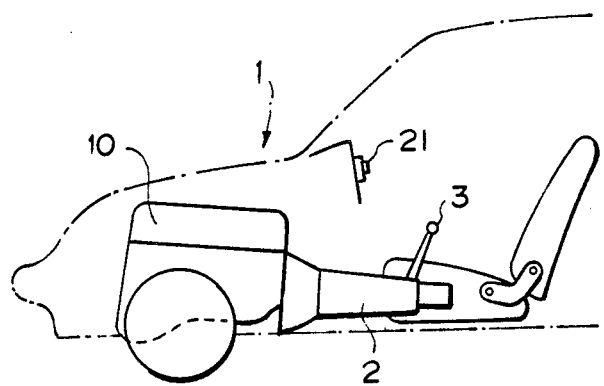
F I G. 2
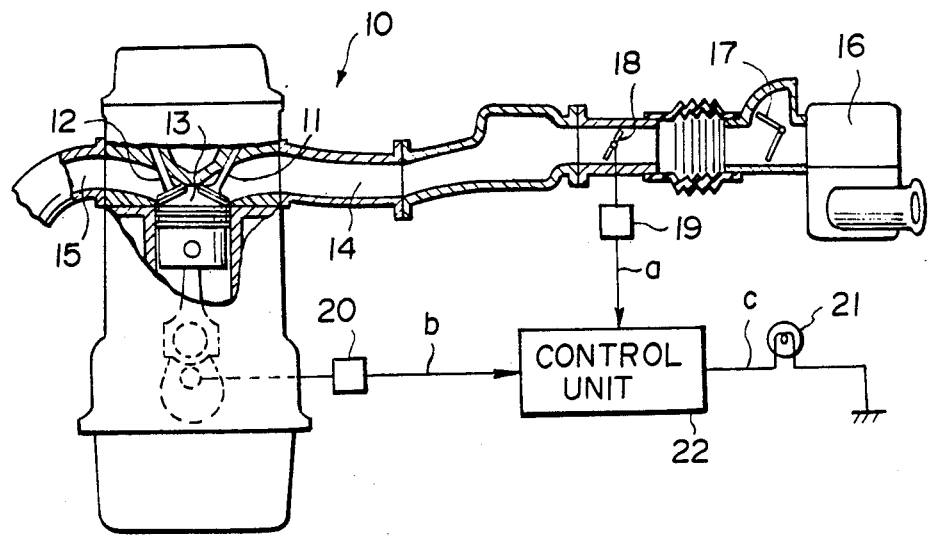

SHIFT INDICATOR SYSTEM FOR VEHICLE

BACKGROUND OF THE INVENTION

1. Field of the Invention

This invention relates to a shift indicator system for a vehicle, and more particularly to a shift indicator system for a vehicle for indicating to the driver the timing to shift so that an optimal fuel economy can be obtained while maintaining a desired running performance.

2. Description of the Prior Art

In the case of a vehicle provided with a manual transmission, the driver shifts at timings determined at his own judgment so that a desired running condition is obtained. However, if the shifting timing is not appropriate, e.g., if a lower gear speed is kept in an operating range of the engine in which a sufficient driving force can be obtained even in the next higher gear speed, fuel economy is reduced. Thus, there have been proposed shift indicators for directing the driver to shift when it is preferable to do so in view of the fuel economy. See Japanese Unexamined Patent Publication Nos. 59(1984)-26332, and 59(1984)-29519. In the shift indicators, there is defined an engine operational range in which the engine speed is higher than a predetermined value and the throttle opening or the engine load is between predetermined upper and lower limits and in which the transmission gear should be shifted up in order to improve fuel economy (such an operational range will be referred to as "upshift range", hereinbelow), and when the actual engine operating condition enters the upshift range, a lamp and/or a buzzer are energized to direct the driver to upshift. The upshift range is determined so that an engine output power sufficient to maintain a desired running performance can be obtained after the upshift. By shifting up the transmission gear when the engine operating condition is in the upshift range, fuel economy can be improved by virtue of reduction of the sliding resistance in various parts of the engine due to reduction of the engine speed, reduction of the pumping loss due to increased throttle opening, and the like.

However, if the upshift range is fixedly set in the shift indicator system, the upshifting indication does not conform to the driver's feeling depending on the engine operating condition, or reduction of fuel consumption cannot be obtained when the driver upshifts following the indication of upshifting depending on the engine operating condition. For example, if the upshifting indication is made when the driver intends to accelerate the vehicle by pushing down the accelerator pedal with the transmission kept in a low speed, the indication deviates from the intention of the driver, thereby adversely affecting the reliability and properness of the indication. Further, for example, if the transmission is shifted up following the indication of upshifting when the engine speed is abruptly increased over the preset speed in response to acceleration at a low gear speed and the upshifting indication is provided, the engine speed will exceed the preset value by a large amount before the transmission is actually shifted up and accordingly fuel consumption reduction cannot be fully enjoyed.

In Japanese Unexamined Patent Publication No. 59(1984)-29519, it is proposed to change the upshift range depending on the operating condition, especially to change the preset engine speed above which the upshifting indication is to be provided during acceleration of the vehicle. That is, as the acceleration of the engine speed is increased, the preset engine speed is raised to delay providing the upshifting indication. Though this is to avoid a situation in which indication for directing upshift, for instance, from second to third is provided immediately after upshifting from first to second so that the driver cannot follow the indication in the case that the acceleration of the engine speed is very high, this also contributes to prevention of a premature upshifting indication conflicting with the driver's feeling when the driver abruptly pushes down the accelerator pedal to accelerate the vehicle.

Further, in Japanese Unexamined Patent Publication No. 59(1984)-26332, it is proposed to provide the indication of upshifting earlier when the vehicle is being accelerated by lowering the preset engine speed with increase in the acceleration of the engine speed. This is to prevent the engine speed from exceeding the preset engine speed by a large amount before the transmission is actually shifted up and the engine speed is lowered due to the upshift after the upshifting indication is provided in the case that the acceleration of the engine speed is increased due to a low gear speed. With this arrangement, the engine speed can be prevented from being excessively increased to adversely affect the fuel economy.

However, it is impossible to simultaneously implement both the proposals described in the two Japanese patent publications since when the acceleration of the engine speed is large, the preset speed is raised according to one proposal and is lowered according to the other proposal. Therefore, when the fuel economy is to be improved, prevention of untimely provision of the indication of upshifting must be sacrificed, and vice versa.

SUMMARY OF THE INVENTION

In view of the foregoing observations and description, the primary object of the present invention is to provide a shift indicator system in which the fuel economy can be improved and at the same time, an untimely upshifting indication is prevented from being provided during acceleration of the vehicle.

The shift indicator system in accordance with the present invention comprises an engine speed detecting means, an engine speed comparator means for comparing the engine speed detected by the engine speed detector with a preset value, an indicating means which provides an indication for directing upshifting when the engine speed is not lower than the preset value, a delay means which inhibits the indicating means from providing the indication for directing upshifting until the engine speed continues to be not lower than the preset value for a predetermined time interval, an engine speed increasing rate detecting means for detecting the rate of increase of the engine speed, an engine load increasing rate detecting means for detecting the rate of increase of the engine load, and a delay time setting means which receives the outputs of the engine speed increasing rate detecting means and the engine load increasing rate detecting means, and makes the predetermined time interval shorter as the engine speed increasing rate increases and longer as the engine load increasing rate increases.

With this arrangement, when the engine speed is increased at a high rate during acceleration with the transmission in a low gear speed, the upshifting indication is provided relatively early and when the driver pushes down the accelerator pedal to accelerate the vehicle, the upshifting indication is provided relatively late. Accordingly, untimely provision of the upshifting indication, e.g., provision of the indication when the driver intends to accelerate the vehicle, can be prevented, and at the same time, the engine speed can be prevented from exceeding the preset value by a large amount when the transmission is shifted up following the indication when the engine speed is increased at a high rate with the transmission in a low gear speed. Thus, the upshifting indication can be provided so as to always conform to the driver's feeling without adversely affecting fuel economy and accordingly reliability to the shift indicator system can be ensured.

BRIEF DESCRIPTION OF THE DRAWINGS

FIG. 1 is a schematic view showing a vehicle provided with a shift indicator system in accordance with an embodiment of the present invention, FIG. 2 is a schematic view showing the control system of the vehicle.

DESCRIPTION OF THE PREFERRED EMBODIMENT

Figure 3:
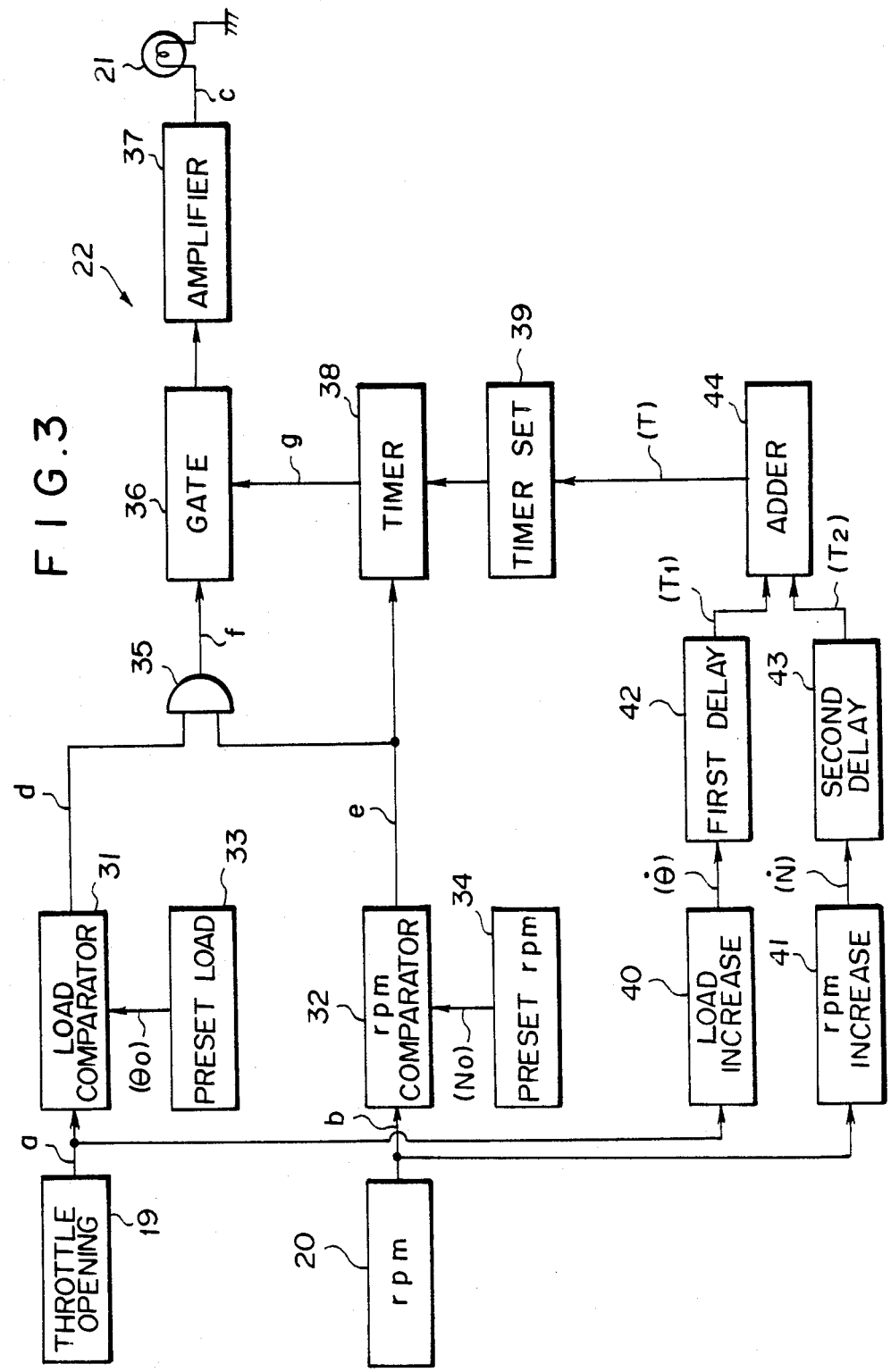
FIG. 3 is a block diagram of the control unit of the shift indicator system.

In FIG. 1, a vehicle 1 provided with a shift indicator system in accordance with the present invention has an engine 10, a manual transmission 2 and a shift lever 3. An upshift indicator lamp 21 for directing the driver to upshift is provided on an instrument panel of the vehicle 1.

As shown in FIG. 2, the engine 10 is provided with an intake passage 14 and an exhaust passage 15 communicated with a combustion chamber 13 respectively by way of intake and exhaust valves 11 and 12. In the intake passage 14, there are disposed an air cleaner 16, an airflow meter 17, a throttle valve 18, and a fuel injection valve (not shown) in this order from the upstream side. Though not shown, an emission control system, a muffler and the like are provided in the exhaust passage 15.

A control unit 22 receives a throttle opening signal a from a throttle opening sensor 19 for detecting the opening of the throttle valve 18, and an engine speed signal b from an engine speed speed sensor 20 for detecting the engine speed, and outputs an upshift signal c for actuating the upshift indicator lamp 21 at a predetermined time. As shown in FIG. 3, the control unit 22 comprises an engine load comparing circuit 31, an engine speed comparing circuit 32, a preset engine load generator 33 for inputting a preset engine load signal $\theta$o into the engine load comparing circuit 31, and a preset engine speed generator 34 for inputting a preset engine speed signal No into the engine speed comparing circuit 32. The engine load comparing circuit 31 receives the throttle opening signal a and outputs signal d at a high level when the engine load represented by the throttle opening signal a is lighter than the preset engine load $\theta$o (e.g., corresponding to a throttle opening of 50°). The engine speed comparing circuit 32 receives the engine speed signal b and outputs signal e at a high level when the engine speed represented by the engine speed signal b is higher than the preset engine speed No (e.g., 2000 rpm). The output signals d and e of the comparing circuits 31 and 32 are input into an AND circuit 35 which delivers an output signal f to a gate circuit 36 when both the signals d and e are at a high level. The output signal f of the AND circuit 35 is applied to the indicator lamp 21 as the upshift signal c through an amplifier 37 when the gate circuit 36 is ON (closed). That is, the indicator lamp 21 is lit when the engine operating condition is in the range in which the engine load (throttle opening) is not heavier than the preset engine load $\theta$o and the engine speed is not lower than the preset engine speed No as represented by the hatched portion in FIG. 4, so long as the gate circuit 36 is ON.

The gate circuit 36 is closed when a gate closure signal g is input into the gate circuit 36 from a timer circuit 38. The timer circuit 38 begins to count a predetermined delay time T set by a timer setting circuit 39 from an instant the signal e at a high level is input thereinto from the engine speed comparing circuit 32, and delivers the gate closure signal g to the gate circuit 36 at an instant the predetermined delay time T expires.

Figure 5:
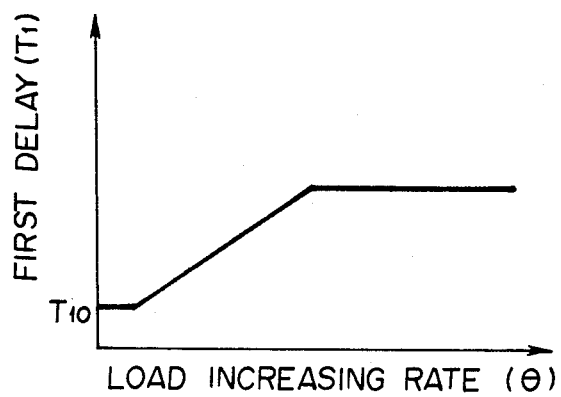
FIGS. 5 and 6 are graphs showing the functions employed in control of the system.

The predetermined delay time T is set by the timer setting circuit 39 in the following manner. The control unit 22 further comprises an engine load increasing rate calculating circuit 40 for calculating the increasing rate $\theta$ of the engine load on the basis of the throttle opening signal a, an engine speed increasing rate calculating circuit 41 for calculating the increasing rate N of the engine speed on the basis of the engine speed signal b, a first delay time generator 42 which generates a first delay time T1 corresponding to the engine load increasing rate $\theta$ by referring the increasing rate $\theta$ to an engine load increasing rate-delay time function shown in FIG. 5, a second delay time generator 43 which generates a second delay time T2 corresponding to the engine speed increasing rate N by referring the increasing rate N to an engine speed increasing rate-delay time function shown in FIG. 6, and an adder 44 for adding the first and second delay times T1 and T2. The sum of the first and second delay times T1 and T2 is input into the timer circuit 38 as said predetermined delay time T by way of the timer setting circuit 39. According to the engine load increasing rate-delay time function shown in FIG. 5, the first delay time T1 is elongated as the engine load increasing rate $\theta$ increases. On the other hand, according to the engine speed increasing rate-delay time function shown in FIG. 6, the second delay time T2 is shortened as the engine speed increasing rate N increases.

Figure 7:
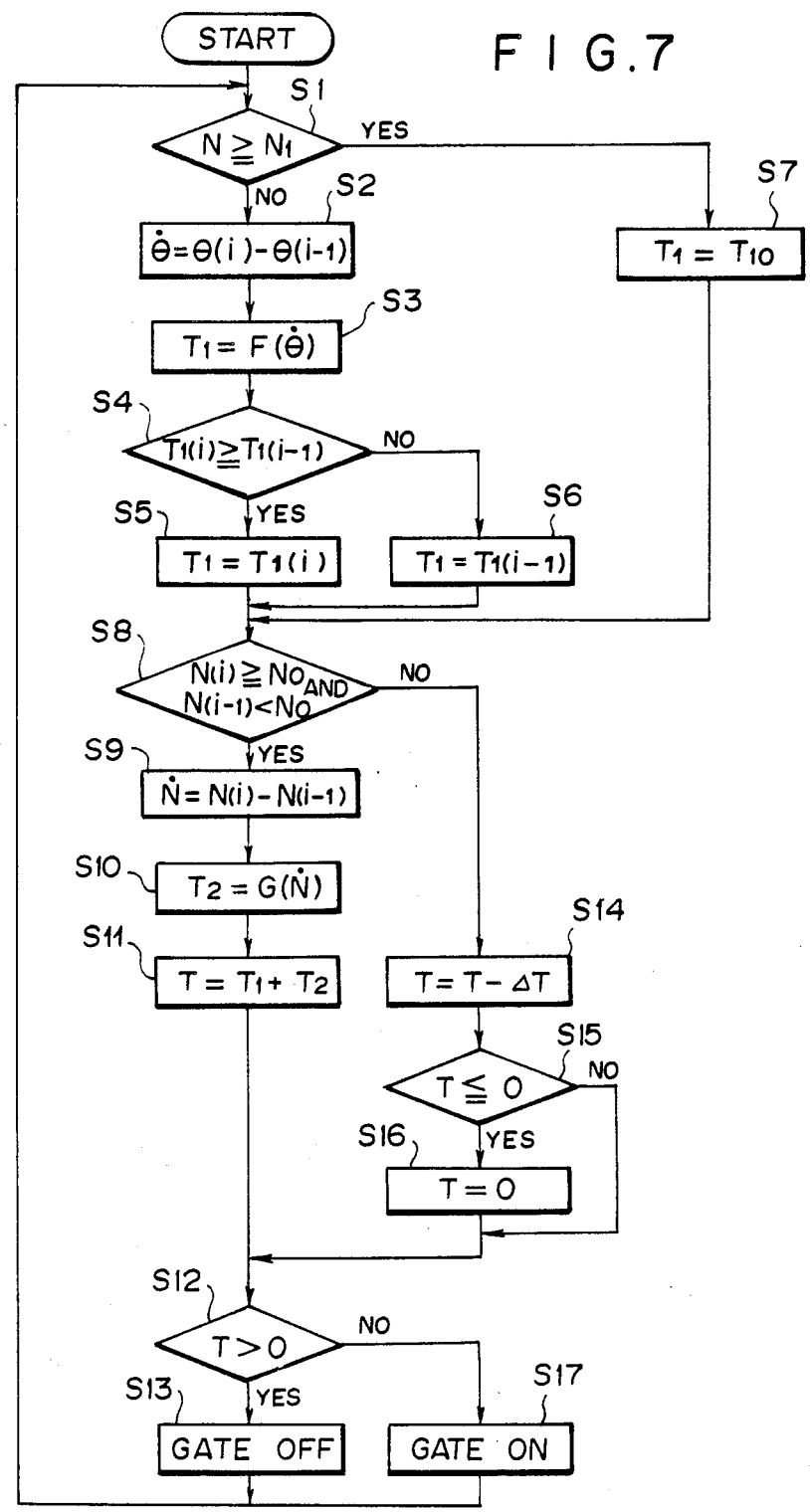
FIG. 7 is a flow chart for illustrating the operation of the control unit.

The operation of the control unit 22 will be described with reference to the flow chart shown in FIG. 7, hereinbelow. This flow chart is given for change in the engine speed with the engine load (throttle opening) being assumed to be lighter than the preset load $\theta$o.

In step S1, it is determined whether the engine speed N is not lower than a predetermined value N1. The predetermined value N1 is slightly higher than the preset engine speed No for defining the upshift range (the hatched portion in FIG. 1) in which the indicator lamp 21 is to be lit, and may be, for instance, 2200 rpm in the case that the preset engine speed No is 2000 rpm. When the engine speed N is lower than the predetermined value N1, the throttle opening detected in the preceding flow $\theta(i-1)$ is subtracted from the throttle opening detected in this flow $\theta(i)$ to obtain the engine load increasing rate $\theta$ (increase in the throttle opening for a unit time) and the engine load increasing rate $\theta$ is referred to the engine load increasing rate-delay time function F shown in FIG. 5 to obtain the first delay time T1 corresponding to the increasing rate θ. (Steps S2 and S3) Then the first delay time obtained in this flow T1(i) is compared with the first delay time obtained in the preceding flow T1(i−1), and the larger one is adopted as a final first delay time T1. (Steps S4 to S6) The procedure according to the steps S4 to S6 is for adopting the first delay time T1 at the flow in which the engine load increasing rate θ is the largest in the case that the engine load increasing rate θ fluctuates and the first delay time T1 is not fixed. The reason why setting of the first delay time T1 is continued until the engine speed reaches the predetermined value N1 higher than the preset speed No defining the lower limit of the engine speed in the upshift range is to set the first delay time T1 corresponding to the engine load increasing rate θ immediately after the operating condition enters the upshift range taking into account the delay in detecting the throttle opening θ. When it is determined that the engine speed N is not lower than the predetermined value N1 in the step S1, the first delay time T1 is set to an initial value T10 (FIG. 5) in step S7.

Figure 6:
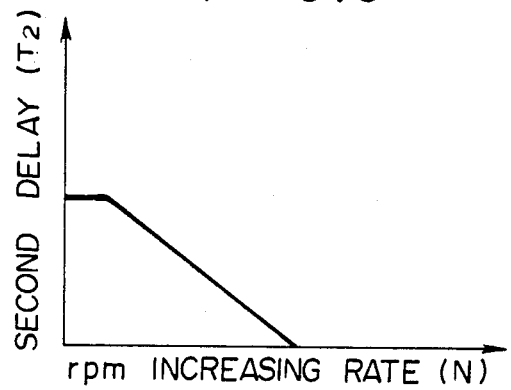

Then in step S8, it is determined whether the engine speed N has just exceeded the preset engine speed No. That is, it is determined whether the engine speed detected in the preceding flow N(i−1) is lower than the preset engine speed No and at the same time the engine speed detected in this flow N(i) is higher than the preset engine speed No. When it is determined that the engine speed has just exceeded the preset engine speed No, the engine speed increasing rate N[=N(i)−N(i−1)] and the second delay time T2 corresponding to the increasing rate N is obtained by referring the increasing rate N to the engine speed increasing rate-delay time function G shown in FIG. 6. (Steps 9 and 10) Then in step S11, the second delay time T2 and the first delay time T1 obtained in the step S5 or S6 are added to obtain the total delay time T.

The total delay time T is positive at first. Accordingly the control unit 22 proceeds to step S13 through step S12 to keep open the gate circuit 36 in FIG. 3. Accordingly, in this case, the upshift signal c is not delivered to the shift indicator lamp 21 even if the signal f at a high level is output from the AND circuit and accordingly, the shift indicator lamp 21 is kept off.

On the other hand, when the engine speed exceeds the preset engine speed No, the control unit 22 proceeds from the step S8 to steps S14 to S16. In the step S14, a certain value ΔT is subtracted from the total delay time T and in the step S15, it is determined whether the remainder is positive. When the remainder becomes 0 or negative after a certain number of flows, the delay time T is set to 0 in the step S16. Accordingly, it is determined that the delay time T is not positive in the step S12. Then the control unit 22 proceeds to step S17 to turn on the gate circuit 36, whereby the signal f from the AND circuit 35 is delivered to the indicator lamp 21 as the upshift signal c to light the lamp 21.

Figure 4:
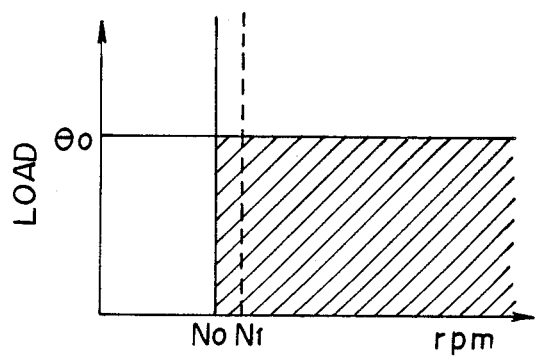
FIG. 4 is a view for illustrating the upshift range.

Thus the upshifting indication is provided the delay time after the engine speed exceeds the preset engine speed No (after the engine operating condition enters the upshift range in FIG. 4). Since the delay time T is the sum of the first delay time T1 which is elongated as the engine load increasing rate θ increases and the second delay time T2 which is shortened as the engine speed increasing rate N increases, when the accelerator pedal is pushed down (the engine load increasing rate θ is high) to accelerate the vehicle, the first delay time T1 is markedly elongated to elongate the total delay time T, and on the other hand, when the engine speed increasing rate N is increased due to a low gear speed, the second delay time T2 is markedly shortened to shorten the total delay time T.

Thus, when the driver pushes down the accelerator pedal to accelerate the vehicle, provision of the upshifting indication is delayed, thereby preventing an untimely indication from being provided, and when the engine speed increasing rate is increased due to a low gear speed, provision of the upshifting indication is advanced, thereby preventing delay of upshift which can adversely affect fuel economy.

We claim:

1. A shift indicator system for a vehicle comprising an engine speed detecting means, an engine speed comparator means for comparing the engine speed detected by the engine speed detector with a preset value, an indicating means which provides an indication for directing upshifting when the engine speed is not lower than the preset value, a delay means for inhibiting the indicating means from providing the indication for directing upshifting for a predetermined time interval, an engine speed increasing rate detecting means for detecting the rate of increase of the engine speed, an engine load increasing rate detecting means for detecting the rate of increase of the engine load, and a delay time setting means which receives outputs of the engine speed increasing rate detecting mans and the engine load increasing rate detecting means, and comprises a first correction means for making the predetermined time interval shorter as the engine speed increasing rate increases and a second correction means for making the predetermined time interval longer as the engine load increasing rate increases.

2. A shift indicator system as defined in claim 1 in which said indicating means is permitted to provide the indication when the engine load is not heavier than a preset engine load.

3. A shift indicator system as defined in claim 2 in which said predetermined time interval is corrected by said second correction means depending on the maximum engine load increasing rate within a constant engine speed region near a predetermined engine speed.

4. A shift indicator system as defined in claim 2 in which said engine load increasing rate is detected through the rate of change in the throttle opening.

5. A shift indicator system as defined in claim 2 in which said predetermined time interval is corrected by said first correction means depending on the engine speed increasing rate at a predetermined engine speed.

6. A shift indicator system as defined in claim 5 in which said predetermined time interval is corrected by said second correction means depending on the maximum engine load increasing rate within a constant engine speed region near a predetermined engine speed.

7. A shift indicator system as defined in claim 6 in which said engine load increasing rate is detected through the rate of change in the throttle opening.

8. A shift indicator system as defined in claim 5 in which said engine load increasing rate is detected through the rate of change in the throttle opening.

9. A shift indicator system as defined in claim 1 in which said predetermined tie interval is corrected by said second correction means depending on the maximum engine load increasing rate within a constant engine speed region near a predetermined engine speed.

10. A shift indicator system as defined in claim 1 in which said engine load increasing rate is detected through the rate of change in the throttle opening.

11. A shift indicator system as defined in claim 1 in which said predetermined time interval is corrected by said first correction means depending on the engine speed increasing rate at a predetermined engine speed.

12. A shift indicator system for a vehicle comprising an engine speed detecting means, an engine speed comparator means for comparing the engine speed detected by the engine speed detector with a preset value, an indicating means which provides an indication for directing upshifting when the engine speed is not lower than the preset value, a delay means which inhibits the indicating means from providing the indication for directing upshifting until the engine speed continues to be not lower than the preset value for a predetermined time interval, an engine speed increasing rate detecting means for detecting the rate of increase of the engine speed, an engine load increasing rate detecting means for detecting the rate of increase of the engine load, and a first correction means which receives an output of the engine speed increasing rate detecting means and outputs a first correction signal for making the predetermined time interval shorter as the engine speed increasing rate increases, a second correction means which receives the output of the engine load increasing rate detecting means, and outputs a second correction signal for making the predetermined time interval longer as the engine load increasing rate increases, and an adder means which receives the first and second corrections signals and determines said predetermined time interval on the basis of the signal obtained by adding the first and second correction signals.

13. A shift indicator system as defined in claim 1, wherein said delay time setting means comprises circuit means for producing a delay time signal corresponding to the engine load increasing rate in accordance with a predetermined rate delay time function and which acts to make said predetermined time interval longer only when the engine load increasing rate increases.

* * * * *